(No Model.)
H. C. STONE.
GRAIN HARVESTER.
No. 441,714. Patented Dec. 2, 1890.
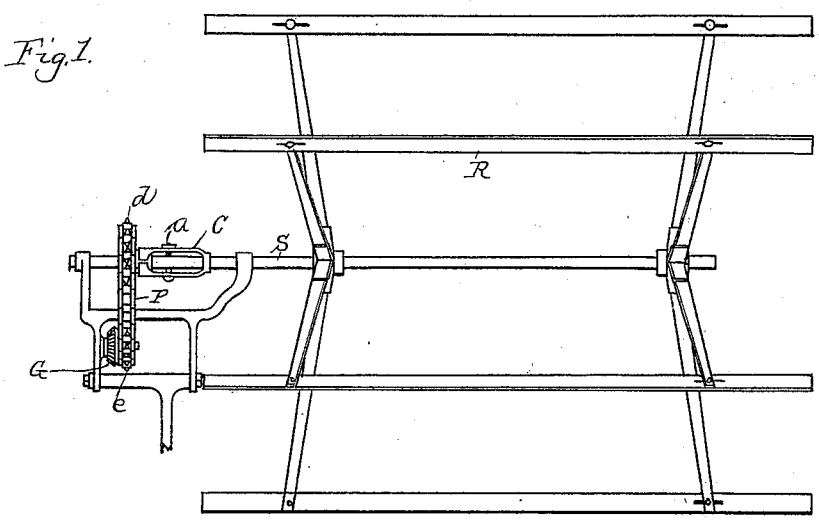
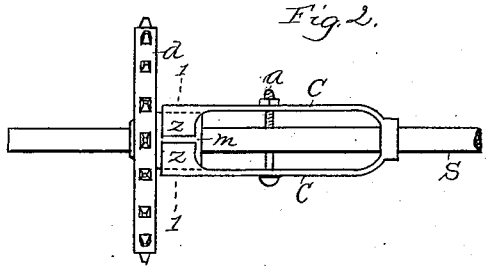
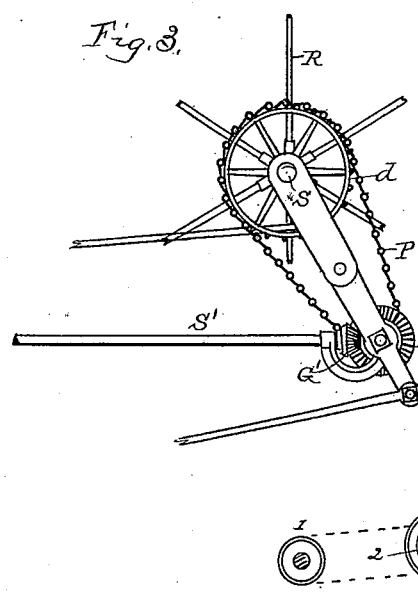
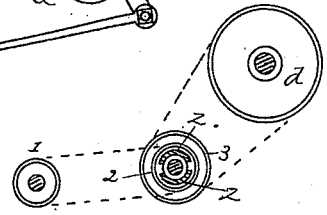
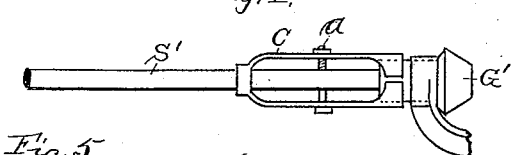
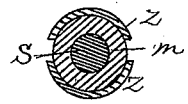
Witnesses.
Arthur Peabody
R. B. Baker.
Inventor.
Henry C. Stone.
By Wm J Hutchins
Atty.

UNITED STATES PATENT OFFICE.

HENRY C. STONE, OF ILLINOIS, SEDGWICK COUNTY, KANSAS.

GRAIN-HARVESTER.

SPECIFICATION forming part of Letters Patent No. 441,714, dated December 2, 1890.

Application filed July 13, 1889. Serial No. 317,459. (No model.)

*To all whom it may concern:*

Be it known that I, HENRY C. STONE, a citizen of the United States of America, residing at Illinois township, in the county of Sedgwick and State of Kansas, have invented certain new and useful Improvements in Grain-Harvesters, of which the following is a specification, reference being had therein to the accompanying drawings, and the letters and figures of reference thereon, forming a part of this specification, in which—

Figure 1 is a front elevation of a grain-harvester reel and its immediate operating mechanism. Fig. 2 is a detailed side view of the friction-clutch mechanism of the reel-shaft. Fig. 3 is a side elevation of the reel-operating mechanism shown in Fig. 1. Fig. 4 is a detailed side view of the friction-clutch as arranged on the reel-driving shaft. Fig. 5 is a detailed plan view of a train of reel-driving wheels and belting, wherein the friction-clutch mechanism is interposed between the drive and the reel-operating wheels; and Fig. 6 is a cross-sectional view of the clutch mechanism on line 1 of Fig. 2.

This invention relates to certain improvements in the mechanism for operating the grain-reel of a harvesting-machine; and it consists in the construction and arrangement of a friction-clutch interposed as a part of the reel-operating mechanism, which improvements are fully set forth and explained in the following specification and claims.

Referring to the drawings, S represents the reel-shaft, suitably supported by means of an adjustable frame, which is common in harvesting-machines. R represents the ordinary reel fixed on said shaft.

$d$ represents a chain-belt wheel sleeved on shaft S between its bearings and connected with said shaft through the medium of the friction-clutch C, which is seated upon the shaft S and fixed thereto by means of its tension-bolt $a$, which is arranged through a hole in the shaft and adapted to be tightened to draw the clamp-arms toward each other, and thus cause the clamps Z (see Fig. 2) of the clutch to yieldingly hold the extended hub $m$ of wheel $d$ between them, and is given sufficient tension to cause the shaft S and reel R to be rotated by means of such frictional contact to properly operate the reel when cutting grain when wheel $d$ is rotated, but permit the clutch to slip and the reel to cease rotating should it engage any obstruction.

S' represents the driving-shaft of the reel-operating mechanism of a grain-harvester and derives its power from other source of the harvester, and is arranged to operate wheel $d$ of the reel-shaft through the medium of its gear G', gear G, interposed in the reel-supporting frame, the chain-belt wheel $c$, connected with said gear G, and the chain belt P in the manner shown, and thus when the harvester is started in operation the reel-shaft and reel will likewise be operated by means of the mechanism described through the medium of the friction-clutch. If desired, the clutch may be arranged on the drive-shaft S' instead of the reel-shaft (see Fig. 4) and clamped upon the hub of gear G'. In such instance said gear would not be fixed to the shaft only as through the medium of the clutch, and the result attained would be the same in the operation of the reel as above described; also, the clutch may be interposed at a point between said two described shafts, as illustrated in Fig. 5, wherein wheel 1 receives power from the harvester-driving mechanism and transmits power to wheel 2 by means of a belt, said wheel 2 being sleeved loosely on its shaft and arranged to drive its shaft by means of a friction-clamp fixed on the shaft and clamped upon the wheel-hub, as above described, thus transmitting power to wheel 3, which is fixed on the shaft, and thence to the reel-shaft wheel $d$ by means of a belt, and in either arrangement the result would be the same.

Having thus described my invention, what I claim as new and useful, and desire to secure by Letters Patent, is as follows:

1. In a grain-harvesting machine, in combination with the reel-operating mechanism thereof, the friction-clutch consisting of the two yielding arms fixed at one end to the shaft upon which they are seated and oppositely bearing against the drive-wheel hub thereof at their opposite end and of the tension-bolt arranged through holes of said arms and the shaft, wherein the bolt is provided with a nut adapted to be turned against or from one of said arms to increase or lessen the frictional contact of said arms against said hub, substantially as and for the purpose specified.

2. The combination, with the reel-operating mechanism in a grain-harvesting machine, of the interposed friction-clutch consisting of two yielding arms fixed to a shaft of the mechanism at one end and provided with the curved segmental bearings at their opposite end bearing against the hub of the drive-wheel thereof and with the central bolt for regulating their tension, substantially as and for the purpose set forth.

HENRY C. STONE.

Witnesses:
R. COGDELL,
ARTHUR PEABODY.